United States Patent
Tanaka et al.

(10) Patent No.: US 12,348,079 B2
(45) Date of Patent: Jul. 1, 2025

(54) MOTOR CORE AND METHOD OF MANUFACTURING THE SAME

(71) Applicant: JFE STEEL CORPORATION, Tokyo (JP)

(72) Inventors: Takaaki Tanaka, Tokyo (JP); Tomoyuki Okubo, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 516 days.

(21) Appl. No.: 17/756,833

(22) PCT Filed: Nov. 18, 2020

(86) PCT No.: PCT/JP2020/043085
§ 371 (c)(1),
(2) Date: Jun. 3, 2022

(87) PCT Pub. No.: WO2021/124780
PCT Pub. Date: Jun. 24, 2021

(65) Prior Publication Data
US 2022/0393520 A1 Dec. 8, 2022

(30) Foreign Application Priority Data
Dec. 16, 2019 (JP) .................. 2019-226786

(51) Int. Cl.
*H02K 1/02* (2006.01)
*C21D 8/12* (2006.01)
(Continued)

(52) U.S. Cl.
CPC ............. *H02K 1/02* (2013.01); *C21D 8/1272* (2013.01); *C21D 9/46* (2013.01); *C22C 38/004* (2013.01);
(Continued)

(58) Field of Classification Search
CPC ...... C21D 8/1272; C21D 9/46; C22C 38/004; C22C 38/02; C22C 38/06; C22C 2202/02;
(Continued)

(56) References Cited

U.S. PATENT DOCUMENTS 4,772,341 A   9/1988  Rastogi et al.
9,512,500 B2  12/2016 Fujikura et al.
(Continued)

FOREIGN PATENT DOCUMENTS

CA   3051823 A1   8/2018
CN   103534376 A  1/2014
(Continued)

OTHER PUBLICATIONS

May 23, 2024, Office Action issued by the Korean Intellectual Property Office in the corresponding Korean Patent Application No. 10-2022-7017244 with English language concise statement of relevance.
(Continued)

*Primary Examiner* — Sally A Merkling
*Assistant Examiner* — Nazmun Nahar Shams
(74) *Attorney, Agent, or Firm* — KENJA IP LAW PC

(57) ABSTRACT

Provided are a motor core having excellent fatigue resistance and a method of manufacturing the motor core at a low cost. The motor core that is an electrical-steel-sheet-stacked body has an outer peripheral surface in which an appearance ratio of recrystallized grains with a grain size of 15 μm or less is 70% or more of a sheet thickness of the motor core.

20 Claims, 2 Drawing Sheets

(51) Int. Cl.
    *C21D 9/46*     (2006.01)
    *C22C 38/00*     (2006.01)
    *C22C 38/02*     (2006.01)
    *C22C 38/06*     (2006.01)
    *H01F 1/147*     (2006.01)
    *H01F 3/02*     (2006.01)
    *H01F 41/02*     (2006.01)

(52) U.S. Cl.
    CPC ............. *C22C 38/02* (2013.01); *C22C 38/06* (2013.01); *H01F 1/147* (2013.01); *H01F 1/14775* (2013.01); *H01F 3/02* (2013.01); *C22C 2202/02* (2013.01); *H01F 41/0233* (2013.01)

(58) Field of Classification Search
    CPC ......... C22C 38/04; C22C 38/12; C22C 38/14; C22C 38/34; C22C 38/38; C22C 38/001; C22C 38/58; H01F 1/147
    See application file for complete search history.

(56) References Cited

U.S. PATENT DOCUMENTS

| | | | |
|---|---|---|---|
| 10,526,673 B2 * | 1/2020 | Okubo | C21D 8/1266 |
| 10,910,152 B2 | 2/2021 | Uesaka et al. | |
| 10,927,430 B2 | 2/2021 | Uesaka et al. | |
| 11,104,973 B2 * | 8/2021 | Zaizen | C22C 38/004 |
| 11,124,854 B2 | 9/2021 | Fujimura et al. | |
| 11,136,645 B2 | 10/2021 | Zaizen et al. | |
| 2017/0260600 A1 | 9/2017 | Okubo et al. | |
| 2020/0010918 A1 | 1/2020 | Zaizen et al. | |

FOREIGN PATENT DOCUMENTS

| | | |
|---|---|---|
| CN | 106574334 A | 4/2017 |
| CN | 110249063 A | 9/2019 |
| JP | 2001220647 A | 8/2001 |
| JP | 2008050686 A | 3/2008 |
| JP | 2016125106 A | 7/2016 |
| JP | 2019178373 A | 10/2019 |
| TW | 201629997 A | 8/2016 |
| TW | 201722574 A | 7/2017 |
| TW | 201835355 A | 10/2018 |
| TW | 201837200 A | 10/2018 |
| WO | 2016017263 A1 | 2/2016 |

OTHER PUBLICATIONS

Dec. 22, 2020, International Search Report issued in the International Patent Application No. PCT/JP2020/043085.

Jun. 9, 2021, Office Action issued by the Taiwan Intellectual Property Office in the corresponding Taiwanese Patent Application No. 109141186 with English language Search Report.

Mar. 8, 2022, Notification of Reasons for Refusal issued by the Japan Patent Office in the corresponding Japanese Patent Application No. 2021-510483 with English language Concise Statement of Relevance.

Jun. 29, 2022, the Extended European Search Report issued by the European Patent Office in the corresponding European Patent Application No. 20903213.5.

Mar. 10, 2025, Office Action issued by the China National Intellectual Property Administration in the corresponding Chinese Patent Application No. 202080082449.0 with English language search report.

* cited by examiner

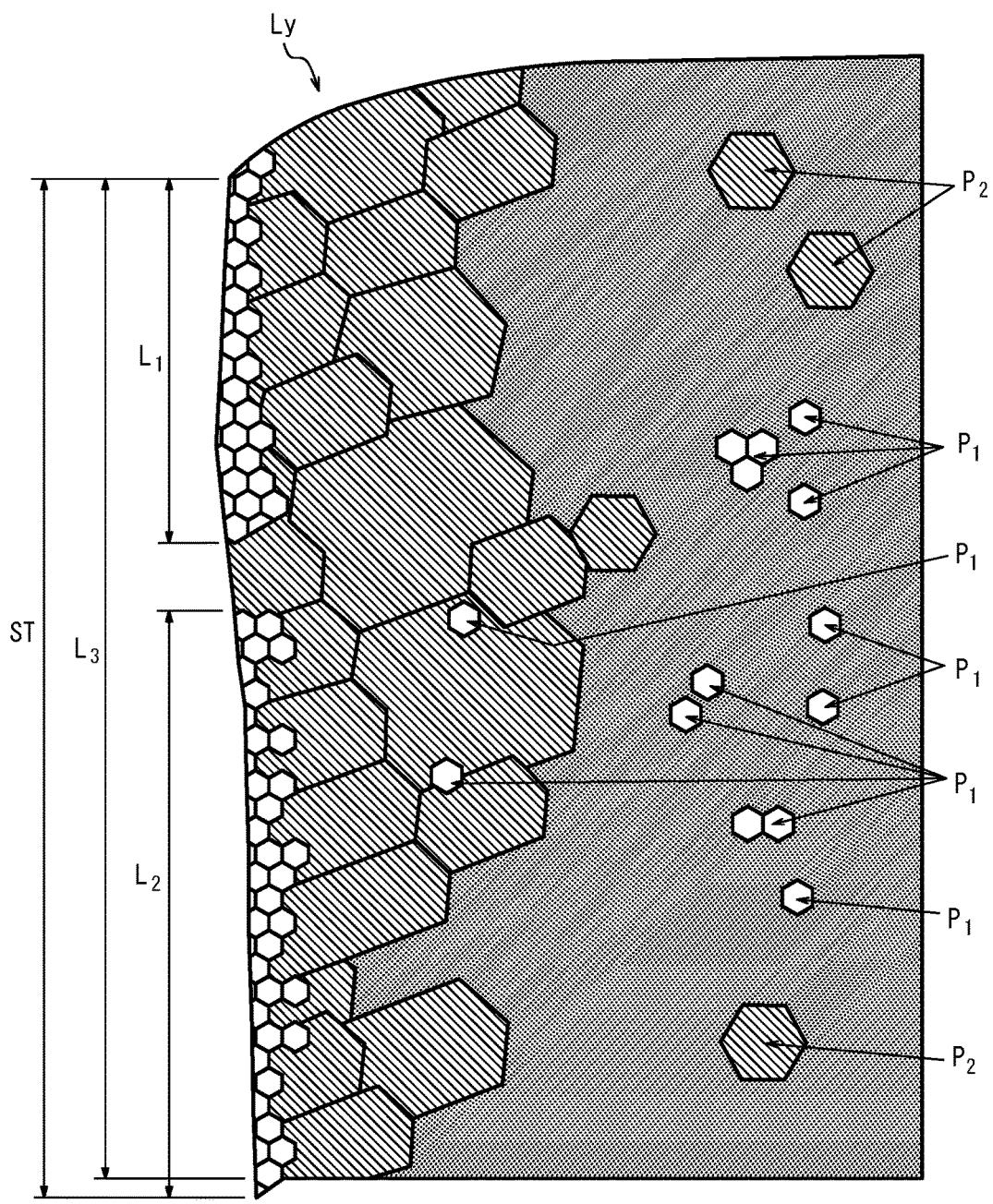

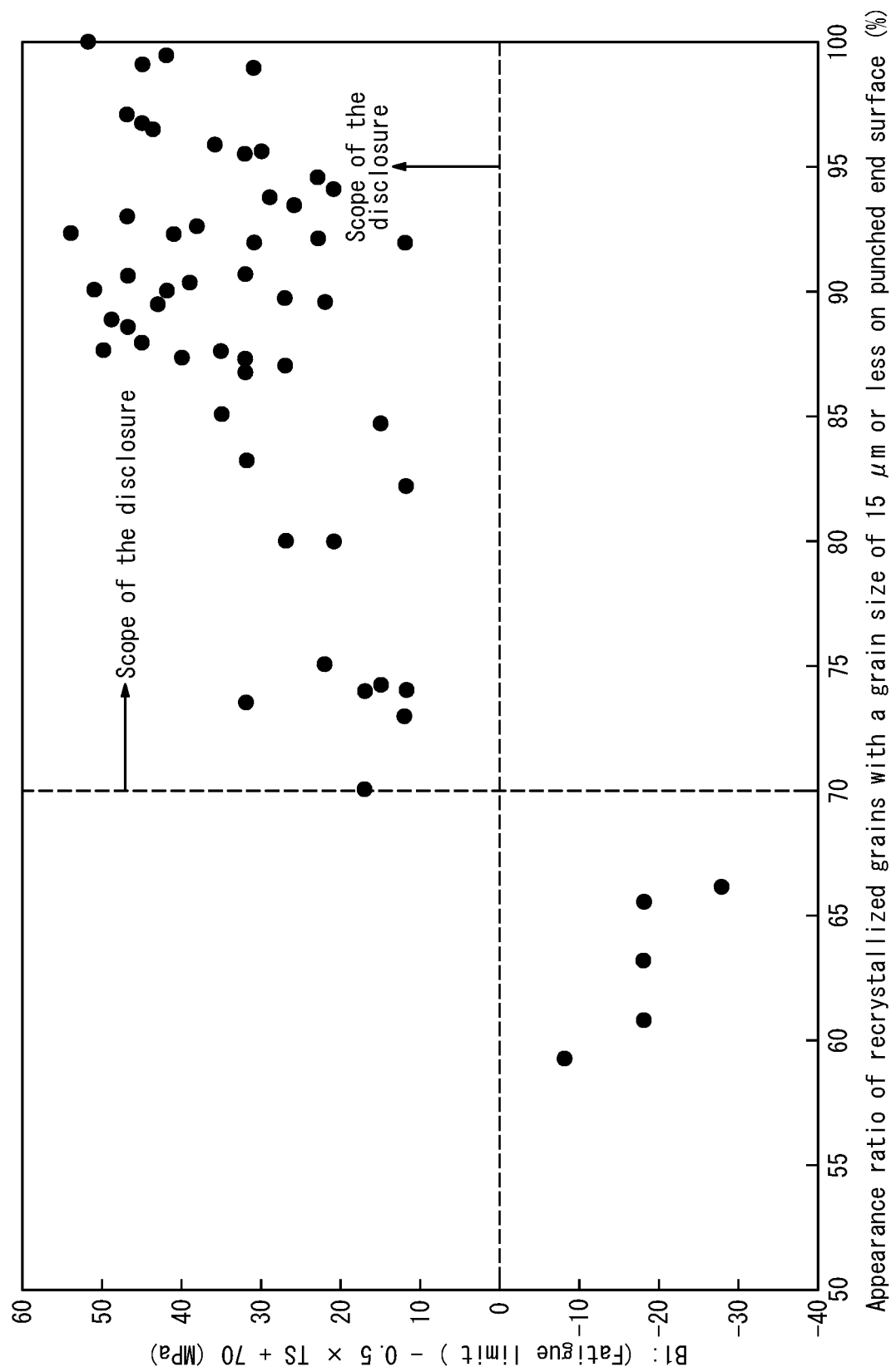

MOTOR CORE AND METHOD OF MANUFACTURING THE SAME

TECHNICAL FIELD

The present disclosure relates to a motor core having excellent fatigue resistance formed by stacking electrical steel sheets and to a method of manufacturing the same.

BACKGROUND

In recent years, as the global demand for energy conservation in electrical equipment has increased, the non-oriented electrical steel sheet used in an iron core (motor core) of rotating machines has been required to have better magnetic properties and fatigue resistance. Recently, there has been a strong need for smaller and higher output drive motors for hybrid electric vehicles (HEVs) and electric vehicles (EVs), and in order to achieve these requirements, increasing the motor rotational speed is being considered.

The following provides a more detailed explanation. The motor core comprises a stator core and a rotor core. The rotor core of the HEV/EV drive motor has a large outer diameter, which results in a large centrifugal force. In addition, the rotor core has a very narrow part (1-2 mm wide) called the rotor core bridge section due to its structure, and this part is under particularly high stress during drive. Furthermore, since the motor rotates and stops repeatedly, the rotor core is subjected to large repetitive stresses due to centrifugal force. Therefore, the electrical steel sheet used for the rotor core must have excellent fatigue resistance.

On the other hand, the electrical steel sheet used for the stator core is required to have high magnetic flux density and low iron loss in order to obtain a smaller and higher output motor. In detail, the electrical steel sheet used for the motor core must have high fatigue resistance for the rotor core and high magnetic flux density and low iron loss for the stator core.

Thus, even if the electrical steel sheet is used in the same motor core, the required properties are very different between the rotor core and the stator core. In the manufacture of the motor core, in order to increase material yield and productivity, rotor core materials and stator core materials are sometimes obtained simultaneously from the same blank sheet by punching, and then the respective core materials are stacked and assembled into the rotor or stator core.

JP2008-050686A (PTL 1) discloses a technique that rotor core and stator core materials are taken from a high-strength non-oriented electrical steel sheet by punching, and then they are stacked and assembled into rotor and stator cores. Then, only the stator core is subjected to stress relief annealing to thereby manufacture a high-strength rotor core and a low-iron-loss stator core from the same blank sheet.

CITATION LIST

Patent Literature

PTL 1: JP2008-050686A

SUMMARY

Technical Problem

However, in the technique disclosed in PTL 1, the yield stress is improved by using the high-strength non-oriented electrical steel sheet, but no consideration is given to improving fatigue resistance, which is one of the most important properties.

It could thus be helpful to provide a motor core having excellent magnetic properties and fatigue resistance and a method of manufacturing the same.

Solution to Problem

1. A motor core that is an electrical-steel-sheet-stacked body, comprising an outer peripheral surface in which an appearance ratio of recrystallized grains with a grain size of 15 μm or less is 70% or more of a sheet thickness of the motor core,
   wherein the outer peripheral surface, which is a surface formed by stacking a plurality of motor core materials taken out from an electrical steel sheet by punching or the like, means an outer peripheral side of the motor core, and the recrystallized grains are crystal grains with GOS of 2.0° or less, the GOS being calculated by averaging results obtained by determining, in all measurement points in a crystal grain, a misorientation between an average orientation of the crystal grain and an orientation at each measurement point.

2. The motor core according to 1., comprising, inside the outer peripheral surface, a non-recrystallized grain layer in which non-recrystallized grains occupy 70% or more of the sheet thickness of the motor core,
   wherein the non-recrystallized grains are crystal grain with GOS of more than 2.0°.

3. The motor core according to 1. or 2., wherein the electrical steel sheet has a chemical composition containing, in mass %,
   C: 0.0100% or less
   Si: 2.0% or more and 7.0% or less,
   Mn: 0.05% or more and 3.0% or less,
   Al: 3.0% or less,
   P: 0.2% or less,
   S: 0.005% or less, and
   N: 0.0050% or less, with the balance being Fe and inevitable impurities.

4. The non-oriented electrical steel sheet according to 3., wherein the chemical composition further contains, in mass %, at least one selected from the group consisting of
   Cr: 0.1% or more and 5.0% or less,
   Ca: 0.001% or more and 0.01% or less,
   Mg: 0.001% or more and 0.01% or less,
   REM: 0.001% or more and 0.01% or less,
   Sn: 0.001% or more and 0.2% or less,
   Sb: 0.001% or more and 0.2% or less,
   Cu: 0.10% or less,
   Ti: 0.010% or less,
   Nb: 0.010% or less,
   V: 0.20% or less,
   Mo: 0.20% or less,
   B: 0.0050% or less,
   Co: 0.1% or less, and
   Ni: 0.1% or less.

5. A method of manufacturing the motor core according to any one of 1. to 4., comprising
   punching motor core materials from the electrical steel sheet,
   stacking the motor core materials,
   performing annealing in which the stacked motor core materials are heated to a temperature of 550° C. or higher and 700° C. or lower at a heating rate of 3°

C./min or more and held at the temperature for 650 seconds or more and 36000 seconds or less.

6. A method of manufacturing the motor core according to any one of 1. to 4., comprising
punching motor core materials from the electrical steel sheet,
performing annealing in which the motor core materials are heated to a temperature of 550° C. or higher and 700° C. or lower at a heating rate of 3° C./min or more and held at the temperature for 650 seconds or more and 36000 seconds or less, and
stacking the annealed motor core materials.

7. The method of manufacturing the motor core according to 5. or 6., wherein a punching clearance in the punching is 3% or more and 15% or less of the thickness of the electrical steel sheet.

8. The method of manufacturing the motor core according to any one of 5. to 7., wherein a punching speed in the punching is 100 mm/s or more and 500 mm/s or less.

Advantageous Effect

According to the present disclosure, a motor core with excellent fatigue resistance can be provided at a low cost.

BRIEF DESCRIPTION OF THE DRAWINGS

In the accompanying drawings:

FIG. 1 is a schematic diagram illustrating the cross-sectional microstructure of a rotor core bridge section; and FIG. 2 illustrates the effect of the appearance ratio of re-crystallized grains with a grain size of 15 μm or less on a punched end surface.

DETAILED DESCRIPTION

The following describes the motor core of the present disclosure.

In the following description, the recrystallized grain is a crystal grain with GOS of 2.0° or less as described above and can be determined by EBSD measurement as described below. The non-recrystallized grain is a crystal grain with GOS of more than 2.0° as described above and can be determined by EBSD measurement as described below. In general, the tensile strength correlates with the fatigue limit. Therefore, in the present disclosure, excellent fatigue resistance means that a fatigue limit determined by subjecting a motor core made of motor core materials to a fatigue test is higher than a reference value obtained by adding a predetermined threshold to half the tensile strength of the motor core materials. Therefore, it can be said that a larger difference between the fatigue limit and the reference value means a more excellent fatigue resistance. As described below, the predetermined threshold is 70 MPa, which is a value set by us to meet the need for high fatigue resistance of future customers.

The motor core of the present disclosure is formed by stacking motor core materials, for example, 100 to 1000 motor core materials that are punched from an electrical steel sheet according to a core shape. In that case, it is essential that recrystallized grains with a diameter of 15 μm or less appear over 70% or more of the sheet thickness of the motor core on the outer peripheral surface of the motor core, that is, the assembled surface consisting of the punched end surfaces of the plurality of motor core materials stacked.
[Appearance Ratio of Recrystallized Grains with a Diameter of 15 μm or Less on the Outer Peripheral Surface (Punched End Surface) of the Motor Core being 70% or More of the Sheet Thickness of the Motor Core]

We have found that when non-recrystallized grains with residual strain appear on the punched end surface (which is the outer peripheral surface of the motor core) of the motor core material punched from the electrical steel sheet used as a base metal, the stress concentrates in the residual strain area when the motor core is subjected to repeated stress, and the area tends to become an initiation point for fatigue cracks. Therefore, recrystallized grains with no residual strain must appear in the punched end surface of the motor core material. However, when the crystal grains on the punched end surface are coarse, even if they are recrystallized grains, when repeated stress is applied, deformation becomes uneven and stress concentration occurs, easily leading to fatigue cracks. On the other hand, when the recrystallized grains appearing on the punched end surface are controlled so that they become fine grains, the end-surface strength increases due to the strengthening by grain refining, which produces an effect of suppressing the occurrence of fatigue cracks.

Based on the above findings, we have made further investigations and found that, in order to sufficiently suppress the occurrence of fatigue cracks by refining the recrystallized grains, it is effective to set the appearance ratio of recrystallized grains with a grain size of 15 μm or less on the punched end surface to 70% or more of the thickness of the punched end surface. The appearance ratio of recrystallized grains in the motor core means the ratio of recrystallized grains with a diameter of 15 μm or less that appear on the punched end surface to the end-surface thickness. Note that simply referring to a "diameter" below indicates a "grain size".

In detail, the fatigue limit of the motor core material can be made higher than the above mentioned reference value by setting the appearance ratio to 70% or higher. By controlling the appearance ratio of recrystallized grains preferably to 80% or more, and more preferably to 90% or more, the fatigue resistance can be further improved.
[Having, Inside Recrystallized Grains with a Diameter of 15 μm or Less, a Non-Recrystallized Grain Layer in which Non-Recrystallized Grains Exist Over 70% or More of the Sheet Thickness of the Motor Core]

As mentioned above, the non-recrystallized grains become an initiation point for fatigue cracks. On the other hand, there are fluctuations in crystal orientation within a non-recrystallized grain, which provides high resistance to the internal propagation of fatigue cracks generated at the punched end surface. It is important to prevent the propagation of fatigue cracks generated at the punched end surface, and thus it is preferable to have a non-recrystallized grain layer inside the steel sheet. To achieve this effect, it is preferable to have a non-recrystallized grain layer in which non-recrystallized grains in a thickness direction exist over 70% or more of the sheet thickness of the punched end surface (hereinafter referred to as existence ratio) on the inner side of the outer peripheral surface of the motor core (inside of the punched end surface), preferably in the adjacent region of the layer of recrystallized grains with a diameter of 15 μm or less. The existence ratio of non-recrystallized grains means the ratio of non-recrystallized grains inside the punched end surface to the sheet thickness of the punched end surface. In detail, when there are a plurality of non-recrystallized layers separated in the thickness direction, the total length of the non-recrystallized grain layers in the thickness direction is the length of the non-recrystallized grain layer.

By setting the existence ratio to 70% or more, the fatigue limit of the motor core material can certainly be made higher than the reference value. By controlling the existence ratio of non-recrystallized grains more preferably to 80% or more, and further preferably to 90% or more, the effect of preventing fatigue crack propagation is further enhanced.

The microstructure that satisfies the above conditions will be explained in detail with reference to FIG. 1, which schematically illustrates the microstructure.

FIG. 1 illustrates the cross-sectional microstructure of a rotor core bridge section made of motor core materials with a sheet thickness of ST. In this cross section, the crystal grains indicated by a white color are recrystallized grains with a diameter of 15 μm or less, and the crystal grains indicated by oblique lines are non-recrystallized grains. In the example illustrated in the figure, the recrystallized grains with a diameter of 15 μm or less appear on the punched end surface, and some non-recrystallized grain appear thereon. In this case, as illustrated in FIG. 1, the appearance length of the recrystallized grains with a diameter of 15 μm or less is $L_1+L_2$, and the appearance ratio of recrystallized grains is $(L_1+L_2)/ST \times 100$. Therefore, a recrystallized grain $P_1$ that does not appear on the punched end surface is not included in the calculation of the appearance ratio. In the example illustrated in the figure, although the non-recrystallized grain appears in part of the punched end surface, it is preferable that no non-recrystallized grain appears on the punched end surface.

Further, it is preferable that a non-recrystallized grain layer Ly exists inside the punched end surface, Ly being an aggregate of non-recrystallized grains that exist continuously adjacent to each other in the thickness direction. The non-recrystallized grain layer Ly is a region where the non-recrystallized grains adjacent to the recrystallized grain layer are continuous in the thickness direction. In the example illustrated in the figure, the length of the non-recrystallized layer Ly in the thickness direction is represented by $L_3$. Then, the existence ratio (%) of non-recrystallized grain layer Ly is $L_3/ST \times 100$. Therefore, a non-recrystallized grain $P_2$ that is separated from this region across the recrystallized grains is not included in the non-recrystallized crystal grain layer Ly. When there are a plurality of non-recrystallized layers that are separated in the thickness direction, the total length of the non-recrystallized layers in the thickness direction is $L_3$.

The remaining area, except for the recrystallized grains with a diameter of 15 μm or less and the non-recrystallized grain layer Ly may be of any microstructure. For example, it may be a microstructure consisting of one or both of recrystallized grains including the recrystallized grain $P_1$ and non-recrystallized grains that do not belong to the non-recrystallized grain layer Ly.

[Chemical Composition of Steel Sheet]

The following describes the preferable chemical composition that the electrical steel sheet used in the motor core of the present disclosure has. While the unit of the content of each element in the chemical composition is "mass %", the content is expressed simply in "%" unless otherwise specified.

C: 0.0100% or less

C is a harmful element that forms carbides while the motor is in use, causing magnetic aging and degrading iron loss properties. In order to avoid the magnetic aging, it is preferable to set the C content in the steel sheet to 0.0100% or less. The C content is more preferably 0.0050% or less. No lower limit is placed on the C content, but since steel sheets with excessively reduced C are very expensive, the lower limit is preferably about 0.0001%.

Si: 2.0% or more and 7.0% or less

Si is effective in increasing the specific resistance of steel and reducing iron loss. Si also has the effect of increasing the strength of the steel through solid solution strengthening. To ensure such effects, the amount of Si added is preferably set to 2.0% or more. On the other hand, a Si amount exceeding 7.0% decreases toughness and thus cracking is likely to occur, so the upper limit is preferably 7.0%. Therefore, the Si content is preferably 2.0% or more. The Si content is preferably 7.0% or less. The lower limit of Si is more preferably 3.0%, and further preferably 3.7% or more.

Mn: 0.05% or more and 3.0% or less

Mn, like Si, is a useful element for increasing the specific resistance and strength of steel, so the Mn content is preferably 0.05% or more. On the other hand, addition exceeding 3.0% decreases toughness and thus cracking is likely to occur during working, so the upper limit is preferably 3.0%. Therefore, the Mn content is preferably 0.05% or more. The Mn content is preferably 3.0% or less. The Mn content is more preferably 0.1% or more. The Mn content is more preferably 2.0% or less.

Al: 3.0% or less

Al, like Si, is a useful element that increases the specific resistance of steel and reduces iron loss. On the other hand, an Al content exceeding 3.0% decreases toughness and thus cracking is likely to occur during working, so the upper limit is preferably 3.0%. The Al content is more preferably 2.0% or less.

When the Al content is more than 0.01% and less than 0.1%, fine MN tends to precipitate to increase iron loss. Therefore, the Al content is more preferably 0.01% or less. The Al content is more preferably 0.1% or more. Since reducing Al improves texture and enhances magnetic flux density, when the magnetic flux density is important, an Al content of 0.01% or less is preferable. The Al content is more preferably 0.003% or less.

P: 0.2% or less

P is a useful element used to adjust the strength (hardness) of steel. On the other hand, a P amount exceeding 0.2% decreases toughness and thus cracking is likely to occur during working, so the upper limit is preferably 0.2% No lower limit is placed on the P content, but since steel sheets with excessively reduced P are very expensive, the lower limit is more preferably about 0.001%. The P content is further preferably 0.005% or more. The P content is further preferably 0.1% or less.

S: 0.005% or less

S is an element that forms fine precipitates and has an adverse effect on iron loss properties. In particular, the adverse effects become more pronounced when the S content exceeds 0.005%, so the S content is preferably 0.005% or less. The Si content is more preferably 0.003% or less.

N: 0.0050% or less

N is an element that forms fine precipitates and has an adverse effect on iron loss properties. In particular, the adverse effects become more pronounced when the N content exceeds 0.0050%, so the N content is preferably 0.0050% or less. The N content is more preferably 0.003% or less.

The balance of the chemical composition of the electrical steel sheet used in the present disclosure is Fe and inevitable impurities. Further, depending on the required properties, the chemical composition further contains at least one element selected from Cr, Ca, Mg REM, Sn, Sb, Cu Ti, Nb, V, Mo, B, Co, and Ni.

Cr: 0.1% or more and 5.0% or less

Cr is effective in increasing the specific resistance of steel and reducing iron loss. In order to achieve such effects, Ni is preferably added in an amount of 0.1% or more. If the Cr content is more than 5.0%, however, a decrease in saturation magnetic flux density leads to a significant decrease in magnetic flux density. Therefore, when Cr is added, the addition amount is preferably 0.1% or more. The addition amount is preferably 5.0% or less.

Ca: 0.001% or more and 0.01% or less

Ca is an element that fixes S as sulfide and contributes to iron loss reduction. In order to achieve such an effect, Ca is preferably added in an amount of 0.001% or more. If the Ca content is more than 0.01%, the effect is saturated and only leads to higher material cost. Therefore, the upper limit is preferably 0.01%.

Mg: 0.001% or more and 0.01% or less

Mg is an element that fixes S as sulfide and contributes to iron loss reduction. In order to achieve such an effect, Mg is preferably added in an amount of 0.001% or more. If the Mg content is more than 0.01%, the effect is saturated and only leads to higher material cost. Therefore, the upper limit is preferably 0.01%.

REM: 0.001% or more and 0.01% or less

REM is an element that fixes S as sulfide and contributes to iron loss reduction. In order to achieve such an effect, REM is preferably added in an amount of 0.001% or more. If the REM content is more than 0.01%, the effect is saturated and only leads to higher material cost. Therefore, the upper limit is preferably 0.01%.

Sn: 0.001% or more and 0.2% or less

Sn is an effective element for enhancing magnetic flux density through the improvement of texture. In order to achieve such an effect, Sn is preferably added in an amount of 0.001% or more. If the Sn content is more than 0.2%, the effect is saturated and only leads to higher material cost. Therefore, the upper limit is preferably 0.2%.

Sb: 0.001% or more and 0.2% or less

Sb is an effective element for enhancing magnetic flux density through the improvement of texture. In order to achieve such an effect, Sb is preferably added in an amount of 0.001% or more. If the Sb content is more than 0.2%, the effect is saturated and only leads to higher material cost. Therefore, the upper limit is preferably 0.2%.

Cu: 0.10% or less

Cu is precipitated in the steel in minute amounts by aging in the annealing process described above and the like and contributes to the increase in strength of the steel sheet through strengthening by precipitation. Therefore, Cu is preferably added in an amount of 0.005% or more. On the other hand, if Cu is excessively added above 0.10%, the precipitated Cu suppresses recrystallization of the punched end surface in the annealing process and also becomes an initiation point for fatigue cracks, which may degrade the fatigue resistance. For this reason, when Cu is added, the Cu content is preferably 0.10% or less. Furthermore, the Cu content is more preferably 0.05% or less.

Ti: 0.010% or less

Ti is precipitated as carbide in the steel in minute amounts by aging in the annealing process described above and the like and contributes to the increase in strength of the steel sheet through strengthening by precipitation. Therefore, Ti is preferably added in an amount of 0.0005% or more. On the other hand, if Ti is excessively added above 0.010%, the precipitated Ti carbide suppress recrystallization of the punched end surface in the annealing process and also becomes an initiation point for fatigue cracks, which may degrade the fatigue resistance. For this reason, when Ti is added, the Ti content is preferably 0.010% or less. Furthermore, the Ti content is more preferably 0.005% or less.

Nb: 0.010% or less

Nb is precipitated as carbide in the steel in minute amounts by aging in the annealing process described above and the like and contributes to the increase in strength of the steel sheet through strengthening by precipitation. Therefore, Nb is preferably added in an amount of 0.0005% or more. On the other hand, if Nb is excessively added above 0.010%, the precipitated Nb carbides suppress recrystallization of the punched end surface in the annealing process and also becomes an initiation point for fatigue cracks, which may degrade the fatigue resistance. For this reason, when Nb is added, the Nb content is preferably 0.010% or less. Furthermore, the Nb content is more preferably 0.005% or less.

V: 0.20% or less

V is precipitated as carbide in the steel in minute amounts by aging in the annealing process described above and the like and contributes to the increase in strength of the steel sheet through strengthening by precipitation. Therefore, V is preferably added in an amount of 0.0005% or more. On the other hand, if V is excessively added above 0.20%, the precipitated V carbides suppress recrystallization of the punched end surface in the annealing process and also becomes an initiation point for fatigue cracks, which may degrade the fatigue resistance. For this reason, when V is added, the V content is preferably 0.20% or less. Furthermore, the V content is more preferably 0.05% or less.

Mo: 0.20% or less

Mo is precipitated as carbide in the steel in minute amounts by aging in the annealing process described above and the like and contributes to the increase in strength of the steel sheet through strengthening by precipitation. Therefore, Mo is preferably added in an amount of 0.0005% or more. On the other hand, if Mo is excessively added above 0.20%, the precipitated Mo carbides suppress recrystallization of the punched end surface in the annealing process and also becomes an initiation point for fatigue cracks, which may degrade the fatigue resistance. For this reason, when Mo is added, the Mo content is preferably 0.20% or less. Furthermore, the Mo content is more preferably 0.10% or less.

B: 0.0050% or less

B is effective in improving the workability of the steel sheet and suppressing fracture during cold rolling. In order to achieve such an effect, B is preferably added in an amount of 0.0010% or more. On the other hand, if the amount exceeds 0.0050%, a large amount of nitrides may form in the steel, which may deteriorate the iron loss. For this reason, when B is added, the B content is preferably 0.0050% or less.

Co: 0.1% or less

Co is effective in enhancing the magnetic flux density of the steel sheet. In order to achieve such an effect, Co is preferably added in an amount of 0.01% or more. On the other hand, when the addition amount exceeds 0.1%, the effect is saturated. Therefore, when Co is added, the amount is preferably 0.1% or less.

Ni: 0.1% or less

Ni is effective in enhancing the magnetic flux density of the steel sheet. In order to achieve such an effect, Ni is preferably added in an amount of 0.01% or more. On the other hand, the addition amount exceeds 0.1%, the effect is saturated. Therefore, when Ni is added, the amount is preferably 0.1% or less.

Next, we will describe a preferable embodiment of a method of manufacturing the motor core of the present disclosure (hereinafter also simply referred to as "manufacturing method of the present disclosure"). Generally stated, the method is for obtaining a motor core with excellent fatigue resistance by a punching process to obtain motor core materials from an electrical steel sheet by punching, a stacking process to stack the motor core materials, and an annealing process to subject the motor core materials or motor core to heat treatment.

<Electrical Steel Sheet>

According to the present disclosure, even if any electrical steel sheet is used as a blank sheet for the motor core, a motor core with superior fatigue resistance can be obtained compared to conventional products. Therefore, the electrical steel sheet used for manufacturing the motor core of the present disclosure is not particularly limited, but from the viewpoint of improving the performance of the motor core, it is desirable to use an electrical steel sheet with as high a magnetic flux density, low iron loss, and high strength as possible.

<Punching Process>

The punching process is the process of punching out motor core materials (rotor core materials and stator core materials) that constitute the rotor core and stator core from the electrical steel sheet.

The punching process is not limited to any particular process, as long as motor core materials of a predetermined size can be obtained from the electrical steel sheet, and a commonly used punching process can be used.

In addition, by combining with punching clearance control and punching speed control, which will be described later, a motor core with superior fatigue resistance can be obtained.

[Punching Clearance: 3% or More and 15% or Less of Sheet Thickness]

When the gap between a punch and a die when punching the motor core material from the electrical steel sheet, i.e., the punching clearance, is less than 3% of the sheet thickness, roughness such as a secondary sheared surface and crack easily occurs on the punched end surface, which may be an initiation point of fatigue cracks and degrade fatigue resistance. Therefore, the punching clearance is preferably set to 3% or more of the sheet thickness. On the other hand, when the punching clearance is larger than 15% of the sheet thickness, strain hardening of the punched end surface by the punching is easily suppressed, recrystallization of the punched end surface is suppressed, and thus fatigue resistance may be degraded. Therefore, the punching clearance should be 15% or less of the sheet thickness. Therefore, the punching clearance is preferably 3% or more of the sheet thickness. The punching clearance is preferably 15% or less of the sheet thickness. The punching clearance is more preferably 5% or more of the sheet thickness. The punching clearance is more preferably 12% or less of the sheet thickness.

[Punching Speed: 100 mm/s or More and 500 mm/s or Less]

If the punching speed when punching out the motor core material from the electrical steel sheet is less than 100 mm/s, a stress-concentrated area such as burrs is easily generated, which may become an initiation point for fatigue cracks and degrade fatigue resistance. Therefore, it is preferable to set the punching speed to 100 mm/s or higher. On the other hand, if the punching speed exceeds 500 mm/s, a stress concentration area such as roughness and chipping is easily generated on the punched end surface, and fatigue resistance may decrease. Therefore, it is preferable to set the punching speed to 500 mm/s or less.

<Stacking Process>

The stacking process is a process of stacking the motor core materials to manufacture the motor core. The stacking process is not limited to any particular process as long as the motor core materials can be stacked within a predetermined size, and the commonly used stacking process can be used.

<Annealing Process>

The annealing process is a process of subjecting the motor core materials or the motor core formed by stacking the motor core materials to annealing. In more detail, the annealing process consists of heating the motor core material or motor core to a temperature of 550° C. or higher and 700° C. or lower at a heating rate of 3° C./min or more, holding it for 650 seconds or more and 36000 seconds or less, and then subjecting it to cooling. The temperature here is the surface temperature of the steel sheet. When the motor core formed by stacking the motor core materials is annealed, it may take a long time to raise the internal temperature of the steel sheet, but in the present disclosure, it is sufficient for the punched end surface to have a predetermined heat hysteresis, so all temperatures described below mean the surface temperature of the steel sheet.

[Heating Rate: 3° C./Min or More]

If the heating rate is less than 3° C./min, the temperature is kept below the temperature at which recrystallization starts for a long time, resulting in excessive recovery before recrystallization starts. As a result, the punched end surface does not recrystallize sufficiently, and the desired steel sheet microstructure in which recrystallized grains with a grain size of 15 μm or less appear over 70% or more of the sheet thickness on the punched end surface (hereinafter referred to simply as "desired steel sheet microstructure"), is not obtained. Therefore, the heating rate is limited to 3° C./min or more. Preferably, it is 5° C./min or more. No upper limit is placed on the heating rate, but when the heating rate exceeds 50° C./min, the formation of recrystallization nuclei is accelerated and as a result, the existence ratio of non-recrystallized grain layer inside the punched end surface may be less than 70%. For this reason, the heating rate is preferably 50° C./min or less.

[Annealing Temperature: 550° C. or Higher and 700° C. or Lower]

When the annealing temperature is less than 550° C., recrystallization of the punched end surface by annealing does not occur sufficiently, and the punched end surface of the manufactured motor core does not have the desired steel sheet microstructure. On the other hand, when the annealing temperature exceeds 700° C., the recrystallized grains on the punched end surface grow excessively and the grain size becomes coarse, and thus the punched end surface does not have the desired steel sheet microstructure. For this reason, the annealing temperature T is limited in a range of 550° C. to 700° C. Preferably, the annealing temperature is preferably 570° C. or higher. The annealing temperature is preferably 650° C. or lower.

[Holding at Annealing Temperature for 650 Seconds or More and 36000 Seconds or Less]

When the holding time at the above annealing temperature is less than 650 seconds, recrystallization by annealing does not occur sufficiently, and the punched end surface of the manufactured motor core does not have the desired steel sheet microstructure. On the other hand, when the holding time at the above annealing temperature exceeds 36000 seconds, the recrystallized grains on the punched end surface grow excessively and the grain size becomes coarse, and thus the punched end surface does not have the desired steel sheet microstructure. Therefore, the holding time at the above annealing temperature is set to 650 seconds or more and 36000 seconds or less. The holding time is preferably 1200 seconds or more. The holding time is preferably 18000 seconds or less.

The motor core obtained as described above has excellent fatigue resistance, but even better fatigue resistance can be obtained when a high strength steel sheet is used as a blank sheet for the motor core. In this case, when there is concern about iron loss degradation in the stator core due to the use of high strength steel sheet, stress relief annealing may be applied to the stator core only to improve iron loss.

EXAMPLES

<Manufacture of Motor Core>

Stator core materials and rotor core materials were taken from the electrical steel sheets having the sheet thicknesses and chemical compositions listed in Table 1-1 and Table 1-2 by punching conforming to the above punching conditions. Then, stator and rotor cores were manufactured from the same blank sheet by stacking 400 sheets of the corresponding core materials. Furthermore, the above rotor cores were subjected to heat treatment (annealing) under the conditions listed in Table 2-1 and Table 2-2.

<Evaluation>

Test pieces were taken from the obtained rotor cores and EBSD measurements were performed as described below. For the measurement of fatigue resistance, tensile fatigue test pieces were fabricated by using the same electrical steel sheets as the rotor cores, punching them under the same conditions and performing heat treatment under the same conditions. In addition, for tensile strength measurement and magnetic property evaluation, tensile test pieces and test pieces for magnetic property measurement were fabricated from the same electrical steel sheets as the rotor cores, which were subjected to heat treatment under the same conditions. These test pieces were used for magnetic property evaluation, tensile test, and tensile fatigue test. The test methods were as follows.

(EBSD Measurement)

A test piece for EBSD measurement was cut out from the bridge section of each rotor core so that the surface perpendicular to the sheet surface and the punched end surface becomes the observation plane and embedded in resin.

The observation plane was polished and mirrored by chemical polishing. Electron backscatter diffraction (EBSD) measurement was performed on the observation plane in a field of view that included the punched end surface and its vicinity. The EBSD measurement was performed under the following conditions: step size: 0.3 μm, measurement area: full thickness in the thickness direction×half or more of the sheet thickness in the direction orthogonal to the thickness direction. Then, the above measurement result was analyzed using the analysis software: OIM Analysis 8 for the local orientation data analysis. Prior to the above data analysis, the measurement points were selected under the condition of GSZ [&; 5.000,20,0.100,0,0,8.0,1,1,1.0,0;]>0.000 in Partition Properties (Minimum Size: 20 points, Minimum Confidence Index: 0.1, Grain Size>0) and used for the analysis. All the analyses were performed under the condition that the Grain Tolerance Angle was 5°.

Of crystal grains with a diameter of 15 μm or less and GOS of 2.0° or less, grains that appeared on the punched end surface were extracted and the percentage (appearance ratio) in the sheet thickness of the area of such crystal grains on the punched end surface was measured. The measurement value corresponds to the percentage in the sheet thickness of recrystallized grains with a grain size of 15 μm or less appearing on the outer peripheral surface (punched end surface) of the rotor core. The above measurement was performed in three fields of view with different punched end surface, and the average thereof was used as the appearance ratio.

In the present embodiment, the ratio of recrystallized grains is a ratio of total length obtained by summing up the lengths in the thickness direction of the plurality of recrystallized grains appearing on the punched end surface in the above observation field to the sheet thickness. Whether the recrystallized grains are adjacent to each other or not, the lengths of parts on which the recrystallized grains appear are summed. In addition, a recrystallized grain that does not appear on the punched end surface, even if it is adjacent to the recrystallized crystal grain that appears on the punched end surface, is not included in the appearance ratio of the present embodiment.

In detail, as illustrated in FIG. 1, the length of the recrystallized grains appearing on the punched end surface in the present embodiment is the sum of the lengths $L_1$ and $L_2$. Further, when $0.7 \times$ sheet thickness $ST \leq L_1 + L_2$ is satisfied, it can be said that recrystallized grains with a grain diameter of 15 μm or less appear over 70% or more of the sheet thickness on the outer peripheral surface (punched end surface) of the motor core.

Next, in the inner layer (inside the punched end surface) of the rotor core, crystal grains with GOS more than 2.0° were extracted, and the percentage in the sheet thickness of the area of such crystal grains was measured. The measurement value corresponds to the percentage in the sheet thickness of the non-recrystallized grain layer in the inner layer (inside the punched end surface) of the rotor core (i.e., the existence ratio of non-recrystallized grain layer).

Here, the non-recrystallized grain layer in the present embodiment refers to a layer in which a plurality of non-recrystallized grains are integrated and continuous in the thickness direction as described above, and specifically consists of an aggregate of a plurality of non-recrystallized crystal grains adjacent to each other. The existence ratio of non-recrystallized grains is calculated by the length in the thickness direction of the non-recrystallized layer relative to the sheet thickness.

In detail, as illustrated in FIG. 1, the non-recrystallized layer in the present embodiment consists of an aggregate of non-recrystallized layers adjacent to each other, and the length in the thickness direction of the non-recrystallized layer Ly is $L_3$. And when $0.7 \times$ sheet thickness ST $L_3$ is satisfied, it can be said that the non-recrystallized grain layer exists over 70% or more of the sheet thickness in the inner layer (inside the punched end surface) of the motor core. When there are a plurality of non-recrystallized layers that are separated in the thickness direction, the total length of the non-recrystallized layers in the thickness direction should be longer than $0.7 \times$ sheet thickness ST.

(Tensile Test)

The same electrical steel sheets from which the rotor core materials were taken were subjected to heat treatment under the same conditions as the rotor cores, and from each electrical steel sheet, a JIS No. 5 tensile test piece was taken so that the rolling direction was the tensile direction. The test piece was subjected to a tensile test in accordance with JIS Z2241: 2011 to measure the tensile strength (TS).

(Tensile Fatigue Test)

A tensile fatigue test piece (No. 1 test piece in accordance with JIS Z2 275:1978, b: 15 mm, R: 100 mm) was taken by punching so that the rolling direction was the longitudinal direction from each of the same electrical steel sheets from which the rotor core materials were taken. The tensile fatigue test piece was subjected to heat treatment under the same conditions as the rotor cores and then to fatigue test. The fatigue test we performed under conditions of pulsating tension loading, a stress ratio (=minimum stress/maximum stress) of 0.1, and a frequency of 20 Hz, and the maximum stress at which no fatigue fracture is caused after repetitions of $10^7$ times was determined as a fatigue limit ($\sigma$max). In the evaluation of the test result, when the fatigue limit satisfied the conditions of the equation below, the fatigue resistance was evaluated as excellent, while when the fatigue limit did not satisfy the conditions, the fatigue resistance was evaluated as poor.

Fatigue limit≥0.5×Tensile strength (TS)+70 (MPa)

In the above equation, the fatigue limit generally required in relation to tensile strength is "0.5×tensile strength," and the predetermined threshold value is 70 MPa, which is added on the right side of the above equation. When the above equation is satisfied, a positive value is listed in the column of "B1: (Fatigue limit)−0.5×TS+70" in Table 2 and the notation in the column B2 (Punching fatigue resistance) is "fair", "good", or "excellent". On the other hand, if the above equation is not satisfied, a negative value is listed in column B1 and the notation in column B2 is "poor". In column B2, "fair" is used when the value in column B1 is 0 to 19, "good" is used when the value in column B1 is 20 to 39 and the fatigue resistance are better, and "excellent" is used when the value in column B1 is 40 or more and the fatigue resistance is excellent. It should be noted that "fair", "good", and "excellent" are relative ratings to make the superiority of the fatigue resistance easier to see at a glance and are not absolute ratings. For example, an example with a value of "30" in column B1 clearly has better fatigue resistance than an example with a value of "20," even if they are both rated as "good", and the absolute evaluation of fatigue resistance is based on the numerical value in column B1.

(Magnetic Property Measurement)

Test pieces for magnetic property measurement of 30 mm in width and 180 mm in length were taken so that the rolling direction or direction orthogonal to the rolling direction was the longitudinal direction from each of the same electrical steel sheets from which the rotor core materials were taken. The test pieces were subjected to heat treatment under the same conditions as the rotor cores and then the iron loss $W_{10/400}$ was measured by Epstein's method in accordance with JIS C2550-1:2011. The iron loss values were all excellent.

The results of the evaluation tests are listed in Table 2-1 and Table 2-2. The effect of the appearance ratio of re-crystallized grains with a grain size of 15 μm or less on the punched end surface on the fatigue limit is summarized in FIG. 2. As illustrated in the figure, when the appearance ratio 70% or more, (fatigue limit)−0.5×TS+70 is 10 MPa or more.

The results of Table 1-1, Table 1-2, No. 1 to No. 36 of Table 2-1, and No. 57 to No. 64 of Table 2-2 indicate that the steel sheets have excellent fatigue resistance and iron loss properties regardless of their chemical composition when the appearance ratio is 70% or more. Further, the results of Table 1-1, Table 1-2, No. 1 to No. 36 of Table 2-1, and No. 37 to No. 56 of Table 2-2 indicate that excellent fatigue resistance and iron loss properties can be obtained by setting the punching conditions in the punching process and the annealing conditions in the annealing process as described above. In addition, it can be seen that in order to improve the fatigue resistance, the contribution to the improvement of fatigue resistance is greater when the annealing conditions are controlled more precisely than the punching conditions, and in the annealing conditions, the annealing temperature T and the holding temperature t contribute significantly to the improvement of fatigue resistance.

TABLE 1-1

| Steel sheet | Sheet thickness (mm) | Chemical composition [mass %] | | | | | | | | | | |
|---|---|---|---|---|---|---|---|---|---|---|---|---|
| | | C | Si | Mn | P | S | Al | N | Cr | Ca | Mg | REM |
| A | 0.25 | 0.0049 | 4.2 | 0.07 | 0.012 | 0.0009 | 1.700 | 0.0023 | 0.01 | 0.0002 | 0.0003 | 0.0002 |
| B | 0.35 | 0.0032 | 2.7 | 0.12 | 0.004 | 0.0015 | 2.000 | 0.0023 | 0.01 | 0.0002 | 0.0001 | 0.0002 |
| C | 0.10 | 0.0034 | 6.5 | 0.07 | 0.015 | 0.0005 | 0.005 | 0.0015 | 0.03 | 0.0004 | 0.0003 | 0.0001 |
| D | 0.15 | 0.0011 | 5.1 | 0.06 | 0.006 | 0.0022 | 0.003 | 0.0029 | 0.01 | 0.0004 | 0.0002 | 0.0003 |
| E | 0.25 | 0.0008 | 3.5 | 0.72 | 0.016 | 0.0009 | 1.200 | 0.0023 | 0.03 | 0.0002 | 0.0003 | 0.0002 |
| F | 0.25 | 0.0037 | 2.8 | 0.07 | 0.010 | 0.0007 | 0.600 | 0.0029 | 0.01 | 0.0003 | 0.0002 | 0.0001 |
| G | 0.20 | 0.0007 | 3.7 | 0.27 | 0.006 | 0.0021 | 0.700 | 0.0018 | 0.01 | 0.0003 | 0.0002 | 0.0003 |
| H | 0.30 | 0.0026 | 4.8 | 0.54 | 0.001 | 0.0026 | 0.900 | 0.0021 | 0.03 | 0.0002 | 0.0001 | 0.0004 |
| I | 0.70 | 0.0017 | 3.8 | 0.54 | 0.011 | 0.0009 | 0.400 | 0.0026 | 0.03 | 0.0002 | 0.0003 | 0.0001 |
| J | 0.35 | 0.0052 | 2.4 | 1.22 | 0.001 | 0.0014 | 0.700 | 0.0025 | 0.02 | 0.0004 | 0.0001 | 0.0002 |
| K | 0.35 | 0.0112 | 2.1 | 0.60 | 0.016 | 0.0011 | 0.600 | 0.0017 | 0.02 | 0.0003 | 0.0003 | 0.0002 |
| L | 0.35 | 0.0018 | 7.2 | 0.47 | 0.012 | 0.0007 | 1.500 | 0.0018 | 0.01 | 0.0003 | 0.0003 | 0.0001 |
| M | 0.35 | 0.0019 | 1.7 | 0.17 | 0.005 | 0.0013 | 1.300 | 0.0028 | 0.02 | 0.0001 | 0.0002 | 0.0002 |
| N | 0.25 | 0.0023 | 2.1 | 3.26 | 0.008 | 0.0028 | 0.900 | 0.0017 | 0.01 | 0.0003 | 0.0002 | 0.0004 |
| O | 0.25 | 0.0036 | 4.0 | 0.02 | 0.015 | 0.0013 | 1.300 | 0.0028 | 0.01 | 0.0004 | 0.0003 | 0.0002 |
| P | 0.25 | 0.0043 | 3.0 | 1.31 | 0.009 | 0.0010 | 3.600 | 0.0024 | 0.03 | 0.0003 | 0.0002 | 0.0002 |
| Q | 0.25 | 0.0008 | 2.4 | 0.07 | 0.006 | 0.0029 | 0.050 | 0.0020 | 0.01 | 0.0001 | 0.0002 | 0.0004 |
| R | 0.25 | 0.0030 | 3.7 | 0.49 | 0.015 | 0.0013 | 0.004 | 0.0030 | 0.02 | 0.0003 | 0.0003 | 0.0002 |
| S | 0.50 | 0.0045 | 4.1 | 0.06 | 0.017 | 0.0052 | 0.600 | 0.0027 | 0.01 | 0.0001 | 0.0004 | 0.0002 |
| T | 0.50 | 0.0007 | 4.3 | 0.27 | 0.007 | 0.0006 | 1.300 | 0.0061 | 0.01 | 0.0004 | 0.0002 | 0.0001 |
| U | 0.30 | 0.0041 | 3.6 | 0.14 | 0.009 | 0.0028 | 0.900 | 0.0020 | 0.50 | 0.0004 | 0.0002 | 0.0004 |
| V | 0.30 | 0.0018 | 3.9 | 0.45 | 0.004 | 0.0007 | 1.200 | 0.0019 | 6.20 | 0.0002 | 0.0001 | 0.0001 |

TABLE 1-1-continued

| | | | | | | | | | | | | |
|---|---|---|---|---|---|---|---|---|---|---|---|---|
| W | 0.30 | 0.0040 | 2.9 | 0.60 | 0.007 | 0.0012 | 0.900 | 0.0021 | 0.03 | 0.0035 | 0.0002 | 0.0002 |
| X | 0.30 | 0.0025 | 3.6 | 0.41 | 0.018 | 0.0007 | 0.800 | 0.0023 | 0.03 | 0.0116 | 0.0004 | 0.0001 |
| Y | 0.30 | 0.0025 | 3.4 | 0.39 | 0.015 | 0.0006 | 0.600 | 0.0026 | 0.03 | 0.0002 | 0.0026 | 0.0001 |
| Z | 0.30 | 0.0023 | 4.8 | 1.71 | 0.015 | 0.0005 | 0.600 | 0.0016 | 0.03 | 0.0004 | 0.0123 | 0.0001 |

| Steel sheet | Chemical composition [mass %] | | | | | | | | | |
|---|---|---|---|---|---|---|---|---|---|---|
| | Sn | Sb | Cu | Ti | Nb | V | Mo | B | Co | Ni |
| A | 0.0005 | 0.0004 | 0.0100 | 0.0001 | 0.0009 | 0.0016 | — | — | — | — |
| B | 0.0006 | 0.0004 | 0.0100 | 0.0009 | 0.0006 | 0.0006 | — | — | — | — |
| C | 0.0003 | 0.0001 | 0.0100 | 0.0006 | 0.0006 | 0.0014 | — | — | — | — |
| D | 0.0005 | 0.0006 | 0.0100 | 0.0008 | 0.0002 | 0.0003 | — | — | — | — |
| E | 0.0002 | 0.0004 | 0.0416 | 0.0005 | 0.0002 | 0.0011 | — | — | — | — |
| F | 0.0002 | 0.0006 | 0.0070 | 0.0004 | 0.0007 | 0.0006 | — | — | — | — |
| G | 0.0005 | 0.0002 | 0.0386 | 0.0002 | 0.0001 | 0.0012 | — | — | — | — |
| H | 0.0003 | 0.0003 | 0.0210 | 0.0008 | 0.0005 | 0.0019 | — | — | — | — |
| I | 0.0002 | 0.0005 | 0.0351 | 0.0008 | 0.0003 | 0.0012 | — | — | — | — |
| J | 0.0003 | 0.0005 | 0.0412 | 0.0008 | 0.0009 | 0.0004 | — | — | — | — |
| K | 0.0002 | 0.0002 | 0.0106 | 0.0009 | 0.0010 | 0.0001 | — | — | — | — |
| L | 0.0005 | 0.0002 | 0.0444 | 0.0004 | 0.0003 | 0.0003 | — | — | — | — |
| M | 0.0004 | 0.0005 | 0.0497 | 0.0007 | 0.0003 | 0.0004 | — | — | — | — |
| N | 0.0003 | 0.0002 | 0.0351 | 0.0009 | 0.0004 | 0.0002 | — | — | — | — |
| O | 0.0004 | 0.0005 | 0.0142 | 0.0004 | 0.0007 | 0.0013 | — | — | — | — |
| P | 0.0003 | 0.0004 | 0.0314 | 0.0004 | 0.0008 | 0.0007 | — | — | — | — |
| Q | 0.0005 | 0.0003 | 0.0109 | 0.0005 | 0.0002 | 0.0004 | — | — | — | — |
| R | 0.0005 | 0.0006 | 0.0164 | 0.0006 | 0.0006 | 0.0012 | — | — | — | — |
| S | 0.0002 | 0.0005 | 0.0055 | 0.0006 | 0.0008 | 0.0014 | — | — | — | — |
| T | 0.0004 | 0.0003 | 0.0164 | 0.0008 | 0.0001 | 0.0016 | — | — | — | — |
| U | 0.0003 | 0.0003 | 0.0027 | 0.0008 | 0.0008 | 0.0011 | — | — | — | — |
| V | 0.0004 | 0.0002 | 0.0251 | 0.0005 | 0.0003 | 0.0013 | — | — | — | — |
| W | 0.0003 | 0.0003 | 0.0193 | 0.0009 | 0.0007 | 0.0007 | — | — | — | — |
| X | 0.0003 | 0.0004 | 0.0295 | 0.0003 | 0.0005 | 0.0011 | — | — | — | — |
| Y | 0.0002 | 0.0005 | 0.0262 | 0.0009 | 0.0005 | 0.0010 | — | — | — | — |
| Z | 0.0002 | 0.0001 | 0.0279 | 0.0005 | 0.0004 | 0.0019 | — | — | — | — |

TABLE 1-2

| Steel sheet | Sheet thickness (mm) | Chemical composition [mass %] | | | | | | | | | | |
|---|---|---|---|---|---|---|---|---|---|---|---|---|
| | | C | Si | Mn | P | S | Al | N | Cr | Ca | Mg | REM |
| AA | 0.30 | 0.0039 | 3.5 | 0.25 | 0.011 | 0.0008 | 1.900 | 0.0029 | 0.01 | 0.0002 | 0.0003 | 0.0028 |
| AB | 0.30 | 0.0033 | 4.4 | 0.74 | 0.010 | 0.0023 | 0.600 | 0.0022 | 0.03 | 0.0002 | 0.0002 | 0.0121 |
| AC | 0.30 | 0.0037 | 4.7 | 1.51 | 0.019 | 0.0021 | 1.100 | 0.0019 | 0.03 | 0.0004 | 0.0004 | 0.0003 |
| AD | 0.30 | 0.0015 | 2.2 | 0.79 | 0.006 | 0.0006 | 1.800 | 0.0025 | 0.02 | 0.0003 | 0.0002 | 0.0001 |
| AE | 0.30 | 0.0019 | 3.4 | 1.19 | 0.004 | 0.0018 | 0.600 | 0.0019 | 0.03 | 0.0003 | 0.0001 | 0.0003 |
| AF | 0.30 | 0.0005 | 4.3 | 1.78 | 0.015 | 0.0018 | 1.900 | 0.0023 | 0.03 | 0.0004 | 0.0003 | 0.0003 |
| AG | 0.30 | 0.0050 | 3.9 | 0.59 | 0.007 | 0.0014 | 0.900 | 0.0024 | 0.03 | 0.0002 | 0.0002 | 0.0002 |
| AH | 0.30 | 0.0032 | 4.2 | 1.22 | 0.018 | 0.0013 | 0.500 | 0.0029 | 0.03 | 0.0003 | 0.0004 | 0.0002 |
| AI | 0.30 | 0.0046 | 4.0 | 0.31 | 0.014 | 0.0030 | 0.700 | 0.0017 | 0.02 | 0.0002 | 0.0003 | 0.0004 |
| AJ | 0.30 | 0.0038 | 4.6 | 0.60 | 0.012 | 0.0017 | 1.100 | 0.0027 | 0.02 | 0.0003 | 0.0003 | 0.0002 |
| AK | 0.30 | 0.0006 | 3.3 | 1.36 | 0.016 | 0.0026 | 1.600 | 0.0028 | 0.03 | 0.0003 | 0.0003 | 0.0004 |
| AL | 0.30 | 0.0032 | 3.2 | 1.00 | 0.020 | 0.0009 | 0.900 | 0.0024 | 0.03 | 0.0003 | 0.0004 | 0.0001 |
| AM | 0.30 | 0.0014 | 2.9 | 0.54 | 0.003 | 0.0009 | 1.400 | 0.0018 | 0.03 | 0.0002 | 0.0001 | 0.0002 |
| AN | 0.30 | 0.0022 | 4.6 | 0.17 | 0.016 | 0.0009 | 1.900 | 0.0020 | 0.01 | 0.0002 | 0.0003 | 0.0002 |
| AO | 0.30 | 0.0005 | 3.4 | 1.33 | 0.014 | 0.0025 | 1.835 | 0.0028 | 0.04 | 0.0003 | 0.0003 | 0.0003 |
| AP | 0.30 | 0.0031 | 3.2 | 1.14 | 0.021 | 0.0010 | 0.790 | 0.0027 | 0.03 | 0.0002 | 0.0004 | 0.0002 |
| AQ | 0.30 | 0.0013 | 3.0 | 0.62 | 0.003 | 0.0010 | 1.608 | 0.0018 | 0.03 | 0.0002 | 0.0001 | 0.0001 |
| AR | 0.30 | 0.0019 | 4.8 | 0.17 | 0.018 | 0.0010 | 1.798 | 0.0023 | 0.01 | 0.0002 | 0.0003 | 0.0001 |

| Steel sheet | Chemical composition [mass %] | | | | | | | | | |
|---|---|---|---|---|---|---|---|---|---|---|
| | Sn | Sb | Cu | Ti | Nb | V | Mo | B | Co | Ni |
| AA | 0.0006 | 0.0006 | 0.0441 | 0.0002 | 0.0007 | 0.0010 | — | — | — | — |
| AB | 0.0002 | 0.0003 | 0.0183 | 0.0006 | 0.0006 | 0.0016 | — | — | — | — |
| AC | 0.0290 | 0.0002 | 0.0150 | 0.0008 | 0.0007 | 0.0018 | — | — | — | — |
| AD | 0.2300 | 0.0004 | 0.0044 | 0.0006 | 0.0003 | 0.0002 | — | — | — | — |
| AE | 0.0002 | 0.0350 | 0.0123 | 0.0003 | 0.0003 | 0.0010 | — | — | — | — |
| AF | 0.0006 | 0.2100 | 0.0378 | 0.0009 | 0.0001 | 0.0015 | — | — | — | — |
| AG | 0.0003 | 0.0004 | 0.2100 | 0.0010 | 0.0009 | 0.0013 | — | — | — | — |
| AH | 0.0002 | 0.0006 | 0.0440 | 0.0130 | 0.0006 | 0.0015 | — | — | — | — |
| AI | 0.0003 | 0.0002 | 0.0061 | 0.0007 | 0.0110 | 0.0014 | — | — | — | — |
| AJ | 0.0004 | 0.0005 | 0.0472 | 0.0007 | 0.0007 | 0.2300 | — | — | — | — |

TABLE 1-2-continued

|    |        |        |        |        |        |        |       |        |      |      |
|----|--------|--------|--------|--------|--------|--------|-------|--------|------|------|
| AK | 0.0005 | 0.0005 | 0.0100 | 0.0006 | 0.0001 | 0.0009 | 0.015 | —      | —    | —    |
| AL | 0.0003 | 0.0004 | 0.0100 | 0.0001 | 0.0006 | 0.0009 | —     | 0.0037 | —    | —    |
| AM | 0.0005 | 0.0002 | 0.0100 | 0.0007 | 0.0003 | 0.0007 | —     | —      | 0.03 | —    |
| AN | 0.0006 | 0.0003 | 0.0100 | 0.0004 | 0.0004 | 0.0017 | —     | —      | —    | 0.08 |
| AO | 0.0004 | 0.0004 | 0.0083 | 0.0005 | 0.0001 | 0.0008 | 0.008 | —      | —    | —    |
| AP | 0.0003 | 0.0003 | 0.0083 | 0.0001 | 0.0005 | 0.0008 | —     | 0.0058 | —    | —    |
| AQ | 0.0004 | 0.0002 | 0.0083 | 0.0006 | 0.0003 | 0.0006 | —     | —      | 0.12 | —    |
| AR | 0.0005 | 0.0002 | 0.0083 | 0.0003 | 0.0003 | 0.0014 | —     | —      | —    | 0.15 |

TABLE 2-1

| No. | Steel sheet | Punching process | | Annealing process | | | Appearance ratio of recrystallized grains with grain size of 15 μm or less on punched end surface (%) | Existence ratio of non-recrystallized layer inside punched end surface (%) |
|---|---|---|---|---|---|---|---|---|
| | | Clearance [%] | Punching speed [mm/s] | Heating rate [° C./min] | Annealing temperature T [° C.] | Holding time t [s] | | |
| 1  | A  | 3  | 410 | 3  | 560 | 650   | 75  | 73  |
| 2  | B  | 5  | 350 | 5  | 570 | 14000 | 96  | 89  |
| 3  | C  | 7  | 140 | 5  | 580 | 18000 | 89  | 100 |
| 4  | D  | 7  | 370 | 5  | 590 | 3600  | 90  | 86  |
| 5  | E  | 10 | 420 | 5  | 630 | 6800  | 91  | 89  |
| 6  | F  | 8  | 410 | 5  | 630 | 8100  | 91  | 87  |
| 7  | G  | 12 | 270 | 5  | 610 | 14000 | 85  | 92  |
| 8  | H  | 9  | 260 | 5  | 600 | 3800  | 90  | 92  |
| 9  | I  | 10 | 300 | 10 | 610 | 9100  | 87  | 89  |
| 10 | J  | 8  | 210 | 10 | 550 | 10000 | 100 | 100 |
| 11 | K  | 8  | 310 | 10 | 610 | 4400  | 99  | 92  |
| 12 | L  | 4  | 390 | 10 | 550 | 16000 | 88  | 89  |
| 13 | M  | 7  | 280 | 10 | 610 | 2100  | 89  | 92  |
| 14 | N  | 5  | 300 | 10 | 550 | 5600  | 90  | 86  |
| 15 | O  | 10 | 160 | 10 | 610 | 1900  | 95  | 97  |
| 16 | P  | 6  | 330 | 20 | 570 | 1900  | 99  | 85  |
| 17 | Q  | 7  | 320 | 20 | 560 | 6700  | 96  | 98  |
| 18 | R  | 9  | 380 | 20 | 610 | 1400  | 87  | 92  |
| 19 | S  | 7  | 220 | 20 | 620 | 17000 | 94  | 96  |
| 20 | T  | 8  | 340 | 20 | 620 | 5800  | 92  | 85  |
| 21 | U  | 9  | 240 | 20 | 630 | 1500  | 88  | 94  |
| 22 | V  | 8  | 300 | 20 | 620 | 4600  | 92  | 99  |
| 23 | W  | 8  | 270 | 20 | 620 | 16000 | 92  | 100 |
| 24 | X  | 8  | 290 | 20 | 620 | 3000  | 94  | 91  |
| 25 | Y  | 13 | 380 | 40 | 640 | 1600  | 88  | 91  |
| 26 | Z  | 7  | 160 | 40 | 590 | 11000 | 93  | 96  |
| 27 | AA | 12 | 350 | 40 | 630 | 2100  | 93  | 89  |
| 28 | AB | 7  | 210 | 40 | 570 | 9700  | 87  | 94  |
| 29 | AC | 13 | 280 | 15 | 620 | 14000 | 89  | 96  |
| 30 | AD | 7  | 310 | 15 | 610 | 9500  | 92  | 91  |
| 31 | AE | 4  | 420 | 15 | 560 | 7200  | 97  | 87  |
| 32 | AF | 8  | 180 | 15 | 640 | 1500  | 97  | 100 |
| 33 | AG | 7  | 260 | 15 | 560 | 3100  | 82  | 99  |
| 34 | AH | 9  | 210 | 15 | 600 | 3400  | 74  | 98  |
| 35 | AI | 8  | 320 | 15 | 570 | 13000 | 85  | 88  |
| 36 | AJ | 14 | 450 | 15 | 630 | 11000 | 80  | 87  |

| No. | Tensile strength TS (MPa) | Fatigue limit $\sigma_{max}$ (MPa) | 0.5 × TS + 70 (MPa) | B1: Fatigue limit- 0.5 × TS + 70 (MPa) | B2: Punching fatigue resistance | Iron loss $W_{10/400}$ (W/kg) | Remarks |
|---|---|---|---|---|---|---|---|
| 1  | 656 | 420 | 398 | 22 | Good      | 9.3  | Example |
| 2  | 580 | 390 | 360 | 30 | Good      | 12.9 | Example |
| 3  | 713 | 470 | 427 | 43 | Excellent | 5.4  | Example |
| 4  | 658 | 450 | 399 | 51 | Excellent | 7.7  | Example |
| 5  | 616 | 410 | 378 | 32 | Good      | 9.1  | Example |
| 6  | 566 | 400 | 353 | 47 | Excellent | 12.8 | Example |
| 7  | 610 | 410 | 375 | 35 | Good      | 8.2  | Example |
| 8  | 676 | 430 | 408 | 22 | Good      | 9.6  | Example |
| 9  | 620 | 420 | 380 | 40 | Excellent | 22.1 | Example |
| 10 | 555 | 390 | 348 | 42 | Excellent | 14.6 | Example |

TABLE 2-1-continued

|  |  |  |  |  |  |  |  |
|---|---|---|---|---|---|---|---|
| 11 | 529 | 380 | 335 | 45 | Excellent | 16.9 | Example |
| 12 | 790 | 500 | 465 | 35 | Good | 8.6 | Example |
| 13 | 501 | 370 | 321 | 49 | Excellent | 16.0 | Example |
| 14 | 542 | 380 | 341 | 39 | Good | 9.1 | Example |
| 15 | 633 | 410 | 387 | 23 | Good | 9.1 | Example |
| 16 | 618 | 410 | 379 | 31 | Good | 7.1 | Example |
| 17 | 527 | 370 | 334 | 36 | Good | 16.1 | Example |
| 18 | 596 | 400 | 368 | 32 | Good | 11.2 | Example |
| 19 | 637 | 410 | 389 | 21 | Good | 18.2 | Example |
| 20 | 658 | 440 | 399 | 41 | Excellent | 15.1 | Example |
| 21 | 609 | 420 | 375 | 45 | Excellent | 10.0 | Example |
| 22 | 631 | 440 | 386 | 54 | Excellent | 8.5 | Example |
| 23 | 574 | 380 | 357 | 23 | Good | 10.4 | Example |
| 24 | 622 | 410 | 381 | 29 | Good | 11.4 | Example |
| 25 | 600 | 420 | 370 | 50 | Excellent | 11.1 | Example |
| 26 | 683 | 450 | 412 | 38 | Good | 8.4 | Example |
| 27 | 628 | 410 | 384 | 26 | Good | 9.9 | Example |
| 28 | 655 | 430 | 398 | 32 | Good | 9.3 | Example |
| 29 | 685 | 460 | 413 | 47 | Excellent | 9.1 | Example |
| 30 | 557 | 380 | 349 | 31 | Good | 12.5 | Example |
| 31 | 611 | 420 | 376 | 44 | Excellent | 11.7 | Example |
| 32 | 669 | 450 | 405 | 45 | Excellent | 7.3 | Example |
| 33 | 635 | 400 | 388 | 12 | Good | 10.8 | Example |
| 34 | 650 | 410 | 395 | 15 | Good | 10.7 | Example |
| 35 | 630 | 400 | 385 | 15 | Good | 10.7 | Example |
| 36 | 677 | 430 | 409 | 21 | Good | 10.4 | Example |

TABLE 2-2

| No. | Steel sheet | Punching process | | Annealing process | | | Appearance ratio of recrystallized grains with grain size of 15 μm or less on punched end surface (%) | Existence ratio of non-recrystallized layer inside punched end surface (%) |
|---|---|---|---|---|---|---|---|---|
| | | Clearance [%] | Punching speed [mm/s] | Heating rate [° C./min] | Annealing temperature T [° C.] | Holding time t [s] | | |
| 37 | A | 5 | 500 | 3 | 560 | 650 | 80 | 80 |
| 38 | A | 3 | 410 | 10 | 600 | 5000 | 100 | 97 |
| 39 | A | 8 | 400 | 3 | 550 | 650 | 97 | 85 |
| 40 | A | 8 | 400 | 3 | 560 | 1200 | 90 | 84 |
| 41 | A | 8 | 400 | 30 | 560 | 650 | 87 | 87 |
| 42 | A | 11 | 200 | 4 | 640 | 7100 | 93 | 88 |
| 43 | A | 8 | 240 | 5 | 560 | 14000 | 83 | 92 |
| 44 | A | 7 | 260 | 5 | 680 | 14000 | 90 | 77 |
| 45 | A | 12 | 390 | 5 | 650 | 730 | 74 | 99 |
| 46 | A | 9 | 410 | 5 | 640 | 32000 | 96 | 77 |
| 47 | A | 2 | 410 | 3 | 560 | 650 | 74 | 72 |
| 48 | A | 18 | 410 | 3 | 560 | 650 | 70 | 73 |
| 49 | A | 3 | 50 | 3 | 560 | 650 | 73 | 75 |
| 50 | A | 3 | 700 | 3 | 560 | 650 | 74 | 74 |
| 51 | A | 11 | 200 | <u>2</u> | 630 | 3400 | <u>66</u> | 100 |
| 52 | A | 11 | 200 | <u>70</u> | 640 | 7100 | <u>92</u> | 65 |
| 53 | A | 9 | 370 | 50 | <u>480</u> | 2500 | <u>66</u> | 100 |
| 54 | A | 5 | 210 | 50 | <u>730</u> | 11000 | <u>61</u> | 62 |
| 55 | A | 10 | 230 | 5 | <u>630</u> | <u>620</u> | <u>59</u> | 100 |
| 56 | A | 11 | 420 | 5 | 640 | <u>38000</u> | <u>63</u> | 62 |
| 57 | AK | 12 | 240 | 5 | 640 | <u>5800</u> | <u>86</u> | 97 |
| 58 | AL | 8 | 370 | 5 | 620 | 4000 | 87 | 88 |
| 59 | AM | 5 | 230 | 5 | 580 | 1500 | 86 | 95 |
| 60 | AN | 9 | 200 | 5 | 570 | 17000 | 87 | 96 |
| 61 | AO | 12 | 240 | 5 | 640 | 5800 | 94 | 93 |
| 62 | AP | 8 | 370 | 5 | 620 | 4000 | 86 | 95 |
| 63 | AQ | 5 | 230 | 5 | 580 | 1500 | 88 | 94 |
| 64 | AR | 9 | 200 | 5 | 570 | 17000 | 99 | 98 |

TABLE 2-2-continued

| No. | Tensile strength TS (MPa) | Fatigue limite $\sigma_{max}$ (MPa) | 0.5 × TS + 70 (MPa) | B1: Fatigue limit- 0.5 × TS + 70 (MPa) | B2: Punching fatigue resistance | Iron loss $W_{10/400}$ (W/kg) | Remarks |
|---|---|---|---|---|---|---|---|
| 37 | 656 | 425 | 398 | 27 | Good | 9.0 | Example |
| 38 | 656 | 450 | 398 | 52 | Excellent | 9.6 | Example |
| 39 | 656 | 445 | 398 | 47 | Excellent | 9.2 | Example |
| 40 | 656 | 440 | 398 | 42 | Excellent | 8.0 | Example |
| 41 | 656 | 425 | 398 | 27 | Good | 8.9 | Example |
| 42 | 656 | 445 | 398 | 47 | Excellent | 8.8 | Example |
| 43 | 656 | 430 | 398 | 32 | Good | 8.8 | Example |
| 44 | 656 | 425 | 398 | 27 | Good | 8.5 | Example |
| 45 | 656 | 430 | 398 | 32 | Good | 8.0 | Example |
| 46 | 656 | 430 | 398 | 32 | Good | 8.3 | Example |
| 47 | 656 | 415 | 398 | 17 | Fair | 9.0 | Example |
| 48 | 656 | 415 | 398 | 17 | Fair | 9.5 | Example |
| 49 | 656 | 410 | 398 | 12 | Fair | 9.1 | Example |
| 50 | 656 | 410 | 398 | 12 | Fair | 8.4 | Example |
| 51 | 656 | <u>370</u> | 398 | <u>−28</u> | Poor | 9.6 | Comparative Example |
| 52 | 656 | 410 | 398 | 12 | Fair | 9.2 | Example |
| 53 | 656 | <u>380</u> | 398 | <u>−18</u> | Poor | 9.2 | Comparative Example |
| 54 | 656 | <u>380</u> | 398 | <u>−18</u> | Poor | 9.4 | Comparative Example |
| 55 | 656 | <u>390</u> | 398 | <u>−8</u> | Poor | 8.1 | Comparative Example |
| 56 | 656 | <u>380</u> | 398 | <u>−18</u> | Poor | 8.9 | Comparative Example |
| 57 | 622 | 420 | 381 | 39 | Good | 10.3 | Example |
| 58 | 597 | 400 | 369 | 31 | Good | 10.8 | Example |
| 59 | 584 | 405 | 362 | 43 | Excellent | 11.0 | Example |
| 60 | 672 | 450 | 406 | 44 | Excellent | 8.5 | Example |
| 61 | 631 | 430 | 386 | 44 | Excellent | 10.8 | Example |
| 62 | 596 | 400 | 368 | 32 | Good | 11.7 | Example |
| 63 | 599 | 390 | 370 | 20 | Excellent | 11.0 | Example |
| 64 | 686 | 440 | 413 | 27 | Excellent | 8.8 | Example |

Note:
Underlined if outside the scope of the disclosure.

INDUSTRIAL APPLICABILITY

Since the technique of the present disclosure is effective in improving the fatigue resistance of motor cores, the technique is not limited to the case where the rotor core materials and stator core materials are taken simultaneously from the same blank sheet, but can also be applied to the case where the rotor core materials and stator core materials are taken separately from different blank sheets.

The invention claimed is:

1. A motor core formed by stacking a plurality of motor core materials that are punched from an electrical steel sheet, each of the motor core materials comprising a punched end surface in which an appearance ratio of recrystallized grains with a grain size of 15 μm or less is 70%,
   wherein the appearance ratio of recrystallized grains means a ratio of a total length in thickness direction of the recrystallized grains that appear on the punched end surface to a sheet thickness of the punched end surface.

2. The motor core according to claim 1, each of the motor core materials comprising, in an inner side of the punched end surface, a non-recrystallized grain layer in which an existence ratio of non-recrystallized grains is 70% or more,
   wherein the existence ratio of non-recrystallized grains means a ratio of a total length in thickness direction of the non-recrystallized grains to a sheet thickness of the punched end surface.

3. The motor core according to claim 1, wherein the electrical steel sheet has a chemical composition containing, in mass %,
   C: 0.0100% or less
   Si: 2.0% or more and 7.0% or less,
   Mn: 0.05% or more and 3.0% or less,
   Al: 3.0% or less,
   P: 0.2% or less,
   S: 0.005% or less, and
   N: 0.0050% or less, with the balance being Fe and inevitable impurities.

4. The motor core sheet according to claim 3, wherein the chemical composition further contains, in mass %, at least one selected from the group consisting of
   Cr: 0.1% or more and 5.0% or less,
   Ca: 0.001% or more and 0.01% or less,
   Mg: 0.001% or more and 0.01% or less,
   REM: 0.001% or more and 0.01% or less,
   Sn: 0.001% or more and 0.2% or less,
   Sb: 0.001% or more and 0.2% or less,
   Cu: 0.10% or less,
   Ti: 0.010% or less,
   Nb: 0.010% or less,
   V: 0.20% or less,
   Mo: 0.20% or less,
   B: 0.0050% or less,
   Co: 0.1% or less, and
   Ni: 0.1% or less.

5. A method of manufacturing the motor core according to claim 1, comprising
punching motor core materials from the electrical steel sheet,
stacking the motor core materials,
performing annealing in which the stacked motor core materials are heated to a temperature of 550° C. or higher and 700° C. or lower at a heating rate of 3° C./min or more and held at the temperature for 650 seconds or more and 36000 seconds or less.

6. A method of manufacturing the motor core according to claim 1, comprising
punching motor core materials from the electrical steel sheet,
performing annealing in which the motor core materials are heated to a temperature of 550° C. or higher and 700° C. or lower at a heating rate of 3° C./min or more and held at the temperature for 650 seconds or more and 36000 seconds or less, and
stacking the annealed motor core materials.

7. The method of manufacturing the motor core according to claim 5, wherein a punching clearance in the punching is 3% or more and 15% or less of the thickness of the electrical steel sheet.

8. The method of manufacturing the motor core according to claim 5, wherein a punching speed in the punching is 100 mm/s or more and 500 mm/s or less.

9. The method of manufacturing the motor core according to claim 6, wherein a punching clearance in the punching is 3% or more and 15% or less of the thickness of the electrical steel sheet.

10. The method of manufacturing the motor core according to claim 6, wherein a punching speed in the punching is 100 mm/s or more and 500 mm/s or less.

11. The method of manufacturing the motor core according to claim 7, wherein a punching speed in the punching is 100 mm/s or more and 500 mm/s or less.

12. The method of manufacturing the motor core according to claim 9, wherein a punching speed in the punching is 100 mm/s or more and 500 mm/s or less.

13. The motor core according to claim 2, wherein the electrical steel sheet has a chemical composition containing, in mass %,
C: 0.0100% or less
Si: 2.0% or more and 7.0% or less,
Mn: 0.05% or more and 3.0% or less,
Al: 3.0% or less,
P: 0.2% or less,
S: 0.005% or less, and
N: 0.0050% or less, with the balance being Fe and inevitable impurities.

14. The motor core according to claim 13, wherein the chemical composition further contains, in mass %, at least one selected from the group consisting of
Cr: 0.1% or more and 5.0% or less,
Ca: 0.001% or more and 0.01% or less,
Mg: 0.001% or more and 0.01% or less,
REM: 0.001% or more and 0.01% or less,
Sn: 0.001% or more and 0.2% or less,
Sb: 0.001% or more and 0.2% or less,
Cu: 0.10% or less,
Ti: 0.010% or less,
Nb: 0.010% or less,
V: 0.20% or less,
Mo: 0.20% or less,
B: 0.0050% or less,
Co: 0.1% or less, and
Ni: 0.1% or less.

15. A method of manufacturing the motor core according to claim 2, comprising
punching motor core materials from the electrical steel sheet,
stacking the motor core materials,
performing annealing in which the stacked motor core materials are heated to a temperature of 550° C. or higher and 700° C. or lower at a heating rate of 3° C./min or more and held at the temperature for 650 seconds or more and 36000 seconds or less.

16. A method of manufacturing the motor core according to claim 2, comprising
punching motor core materials from the electrical steel sheet,
performing annealing in which the motor core materials are heated to a temperature of 550° C. or higher and 700° C. or lower at a heating rate of 3° C./min or more and held at the temperature for 650 seconds or more and 36000 seconds or less, and
stacking the annealed motor core materials.

17. The method of manufacturing the motor core according to claim 15, wherein a punching clearance in the punching is 3% or more and 15% or less of the thickness of the electrical steel sheet.

18. The method of manufacturing the motor core according to claim 15, wherein a punching speed in the punching is 100 mm/s or more and 500 mm/s or less.

19. The method of manufacturing the motor core according to claim 16, wherein a punching clearance in the punching is 3% or more and 15% or less of the thickness of the electrical steel sheet.

20. The method of manufacturing the motor core according to claim 16, wherein a punching speed in the punching is 100 mm/s or more and 500 mm/s or less.

* * * * *